F. H. FRENCH.
SAFETY COUPLING FOR DRIVING AND DRIVEN MEMBERS.
APPLICATION FILED APR. 20, 1908.
902,527.
Patented Oct. 27, 1908.
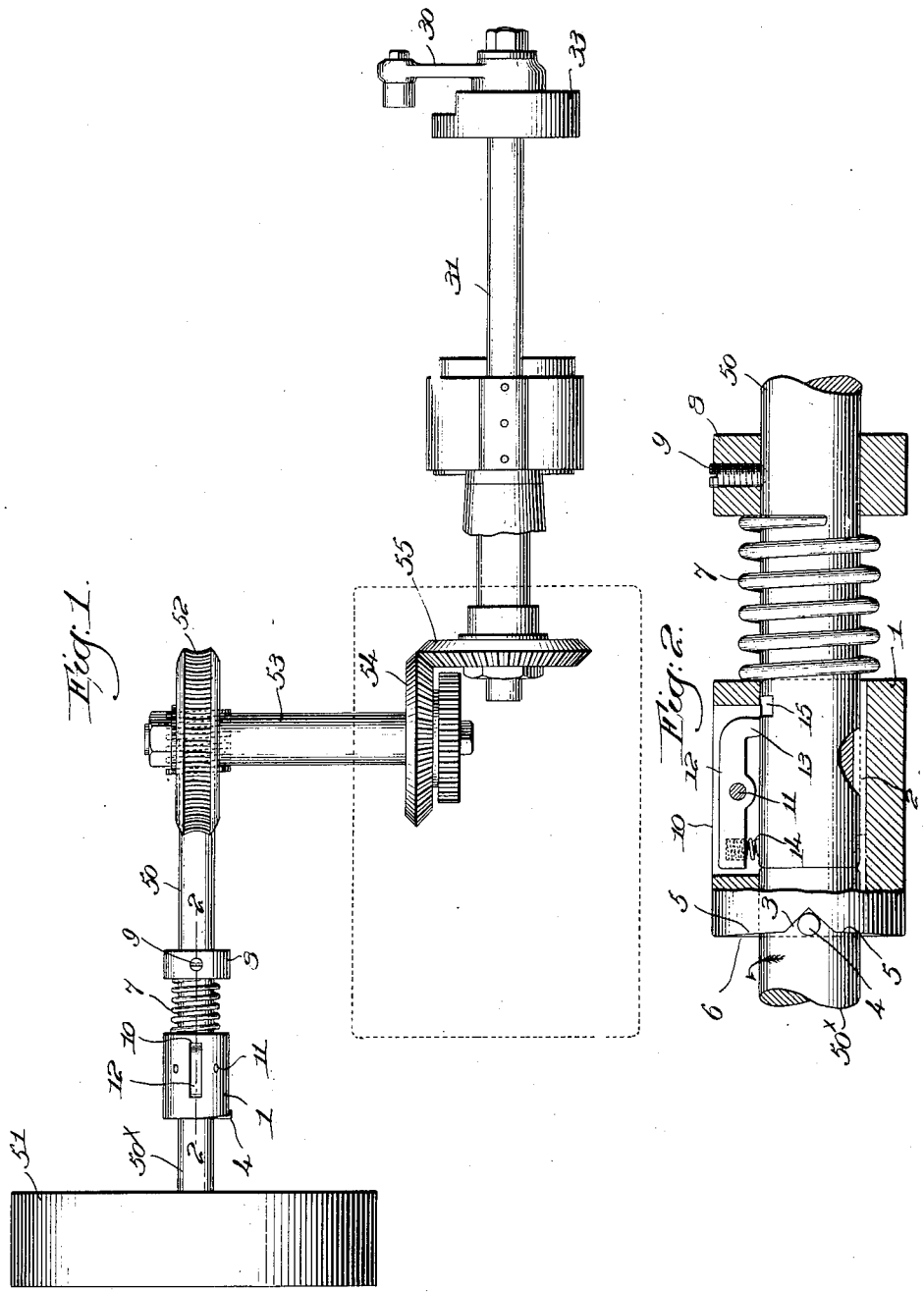

UNITED STATES PATENT OFFICE.

FRANK H. FRENCH, OF HOPEDALE, MASSACHUSETTS, ASSIGNOR TO DRAPER COMPANY, OF HOPEDALE, MASSACHUSETTS, A CORPORATION OF MAINE.

SAFETY-COUPLING FOR DRIVING AND DRIVEN MEMBERS.

No. 902,527.    Specification of Letters Patent.    Patented Oct. 27, 1908.

Application filed April 20, 1908. Serial No. 427,996.

*To all whom it may concern:*

Be it known that I, FRANK H. FRENCH, a citizen of the United States, and resident of Hopedale, county of Worcester, State of Massachusetts, have invented an Improvement in Safety-Couplings for Driving and Driven Members, of which the following description, in connection with the accompanying drawing, is a specification, like letters on the drawing representing like parts.

This invention has for its object the production of a safety coupling to connect under normal conditions the driving and driven members of a piece of apparatus, but which will automatically effect the uncoupling or disconnection of said members when the resistance to the rotation of the driven member increases beyond a predetermined point. A coupling device of this character prevents undue strain or breakage of parts, and is useful in various forms of apparatus, such for instance as machines for boring wood or metal, wherein any clogging of the tool or an abnormal cut would greatly increase the resistance to its operation.

By means of my invention when the resistance becomes abnormal the driving member is automatically uncoupled, the coupling being retained in uncoupled or inoperative position by an automatically acting latch until manually released.

The various novel features of my invention will be fully described in the subjoined specification and particularly pointed out in the following claims.

Figure 1 is a top plan view of the driving and driven portions of a piece of apparatus with one embodiment of my invention applied thereto, the coupling being shown in its operative condition; Fig. 2 is an enlarged detail, principally in section on the line 2—2, Fig. 1, of the coupling and adjacent parts.

I have herein chosen to illustrate my invention in connection with a portion of the mechanism of a machine for boring bobbins, such as forms the subject-matter of United States Patent No. 828,176, granted to Bailey August 7, 1906, but it is to be understood that such selection is for illustrative purposes only.

Referring to Fig. 1 the driven member or shaft 50 has a worm meshing with a worm-gear 52 on a cross-shaft 53 carrying a bevel-gear 54 meshing with a bevel-gear 55 fast on the shaft 31 carrying an arm 30 and disk 33, all substantially as in said patent, the devices referred to being arranged to intermittingly actuate or advance a bobbin-carrier, not herein shown. Herein the driving member or shaft $50^\times$ has fast upon it a pulley 51, to be rotated by a suitable belt, and while in the patent referred to the pulley is fast on the shaft 50 it will be seen that I have cut the shaft in two, the pulley being on the section $50^\times$, which is alined with the main section 50, which latter is the driven member.

In the present embodiment of my invention the driving and driven shafts are normally connected to rotate in unison by means of a coupling comprising a sleeve 1 splined at 2 to the driven shaft 50 (see Fig. 2) to rotate therewith while slidable thereon, the sleeve loosely embracing the adjacent end of the driving shaft $50^\times$ and having a bevel-sided or V-shaped notch 3 in its end, to receive a radial lug or pin 4 on the shaft $50^\times$. At its notched end the coupling sleeve is made cam-shaped, that is, it has faces 5 rising gradually from the sides of the notch 3 to the flat part 6 of the sleeve end, for a purpose to be described.

A strong spring 7 coiled about the shaft 50 bears against the opposite or unnotched end of the sleeve 1, the spring being adjusted by means of a collar 8 held on the shaft 50 by a set-screw 9, the expansive force of the spring acting normally to maintain the lug 4 in the notch 3, so that the rotation of the driving member $50^\times$ will rotate the driven member 50 in unison therewith under normal conditions. Should the resistance of the member 50 to rotation become abnormal, that is, above a predetermined point, as by some clogging of the mechanism actuated by or from the shaft 50, or for any reason, then the lug 4 will ride up the side of the notch 3, pressing the sleeve to the right, Fig. 2, the lug after leaving the notch continuing to press the sleeve toward inoperative position until said lug leaves the incline or cam 5 and rides on the flat end 6 of the sleeve. At this time an automatic latch operates and locks the coupling in inoperative position so that the driving member can continue to rotate without effecting the driven member, until the latch is manually released.

The sleeve 1 is provided with an elongated slot 10 in which is pivoted at 11 a latch 12 having an inturned toe 13, Fig. 2, pressed against the shaft 50 by a suitable spring 14, as shown in Fig. 2, the shaft being provided with a locking seat or recess 15 which is beyond the latch toe when the coupling is operative.

When the coupling is moved as described into inoperative position the toe of the latch is thrown into the recess 15 by the latch-spring 14, so that the sleeve is retained in its inoperative position, leaving the lug 4 free to rotate with the shaft $50^x$ past the adjacent end of the sleeve without interference and until the machine is stopped.

The coupling provides a safety connection between the driving and driven members of the apparatus, and when the fault has been corrected the operator presses down the spring-engaged end of the latch, releasing its toe from the recess 15, unlocking the sleeve and permitting the spring 7 to expand, so that when the shaft $50^x$ by rotation brings the lug 4 opposite the notch 3 the coupling will automatically re-connect the driving and driven members.

My invention may be used with various forms of apparatus, as will be manifest, and may be changed or modified in various details without departing from the spirit and scope of my invention as set forth in the appended claims.

Having fully described my invention, what I claim as new and desire to secure by Letters Patent is:—

1. The combination, with driving and driven shafts, of a coupling normally connecting them to rotate in unison, said coupling comprising a sleeve rotatable with and longitudinally movable upon the driven shaft and having a beveled notch, a lug on the driving shaft to enter the notch, a spring to normally maintain the lug in the notch and effect rotation of the shafts in unison, said driven shaft having a locking recess, and a latch mounted on the sleeve and automatically moved into the locking recess to lock the sleeve in inoperative position when the resistance of the driven shaft overcomes the spring, the lug at such time riding up the side of and out of the notch and moving the sleeve into position to be locked by the latch and disconnecting the shafts.

2. The combination, with driving and driven shafts, of a coupling normally connecting them to rotate in unison, said coupling comprising a sleeve rotatable with and longitudinally movable upon the driven shaft and having one end cam-shaped and provided with a V-shaped notch at the low part of the cam end, a lug on the driving shaft to enter said notch, a spring to normally maintain the lug in the notch to thereby couple the shafts to rotate together, resistance to rotation of the driven shaft when greater than the action of the spring causing the lug to ride up out of the notch and onto the high part of the cam-end of the sleeve, moving the latter into inoperative position, and a spring-actuated latch carried by the sleeve to automatically engage the driven shaft and retain the sleeve inoperative when so positioned.

In testimony whereof, I have signed my name to this specification, in the presence of two subscribing witnesses.

FRANK H. FRENCH.

Witnesses:
ALBERT W. EDWARDS,
EDWARD DANA OSGOOD.